United States Patent [19]

Hasegawa

[11] Patent Number: 4,668,069
[45] Date of Patent: May 26, 1987

[54] EXPOSURE CONTROL DEVICE IN A CAMERA

[75] Inventor: Hiroshi Hasegawa, Tokyo, Japan

[73] Assignee: Nippon Kogaku K. K., Tokyo, Japan

[21] Appl. No.: 860,783

[22] Filed: May 8, 1986

[30] Foreign Application Priority Data

May 13, 1985 [JP] Japan .................................. 60-100902
May 13, 1985 [JP] Japan .................................. 60-100903

[51] Int. Cl.$^4$ ............................................... G03B 7/08
[52] U.S. Cl. ..................................................... 354/428
[58] Field of Search ............... 354/410, 412, 428, 463, 354/464

[56] References Cited

U.S. PATENT DOCUMENTS

| | | |
|---|---|---|
| 4,007,467 | 2/1977 | Wagensonner et al. ............. 354/463 |
| 4,247,186 | 1/1981 | Uchidoi et al. ...................... 354/428 |
| 4,383,749 | 5/1983 | Shinoda et al. .................. 354/428 X |
| 4,442,381 | 4/1984 | Numota ........................... 354/428 X |
| 4,453,811 | 6/1984 | Yamasaki ............................ 354/412 |

Primary Examiner—W. B. Perkey
Attorney, Agent, or Firm—Shapiro and Shapiro

[57] ABSTRACT

An exposure control device in a camera comprises power supply circuit means for producing a temperature signal representative of an amount proportional to the absolute temperature, means for producing a first digital data representative of the film speed, digital-analog converting means for producing a first analog output depending on the ambient temperature from the first digital data and the temperature signal, photometering means having means for producing a second analog output corresponding to the brightness of an object to be photographed and means for adding the second analog output to the first analog output and preparing a photometering output, analog-digital converting means for preparing a second digital data independent on the ambient temperature from the temperature signal and the photometering output, and means for determining the exposure in accordance with the second digital data.

9 Claims, 9 Drawing Figures

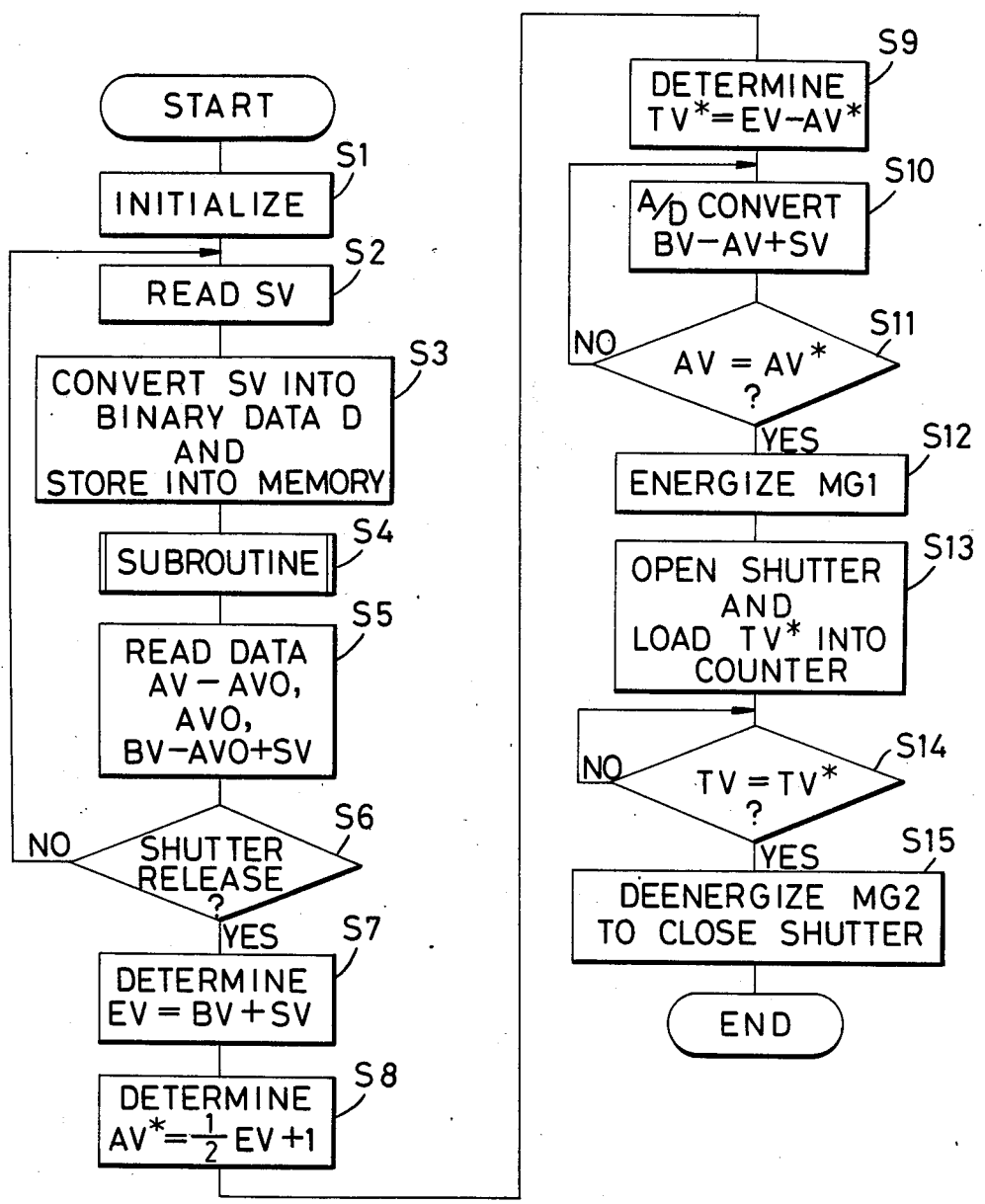

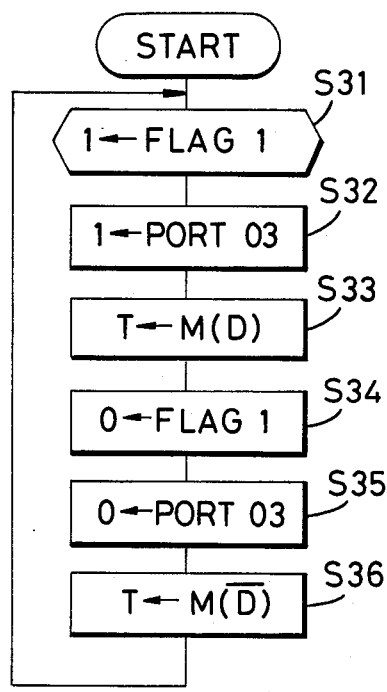
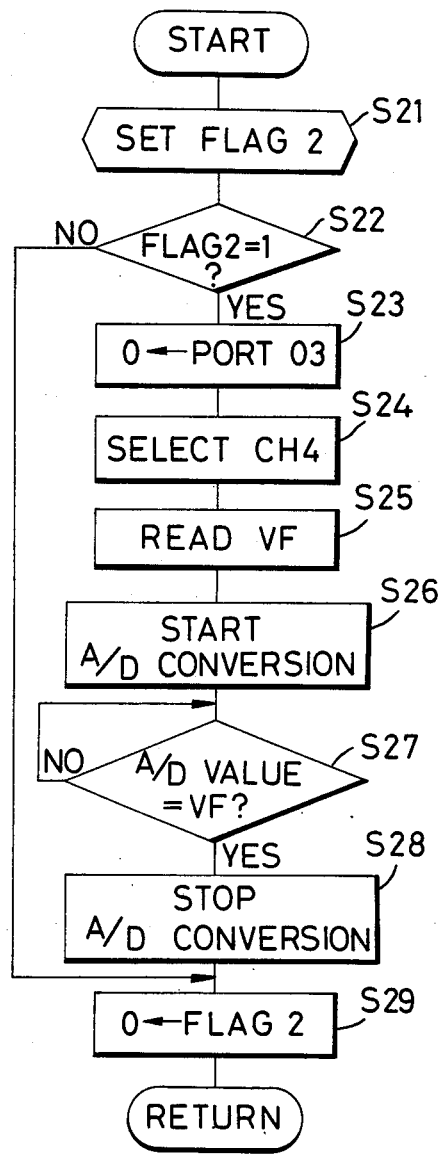

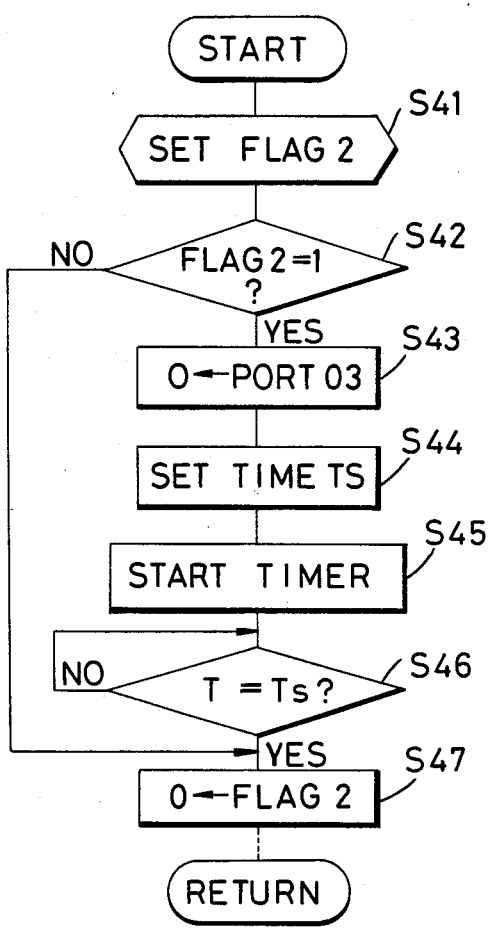

EXPOSURE CONTROL DEVICE IN A CAMERA

BACKGROUND OF THE INVENTION

1. Field of the Invention

This invention relates to an exposure control device in a camera, and in particular to an exposure control circuit in a camera which uses an analog-digital converter and a digital-analog converter to determine the exposure.

2. Related Background Art

In an example of the photometering circuit of a camera, a photocurrent flowing through a photodiode is logarithmically compressed and taken out by the use of an operational amplifier and a diode and the photometering output thereof is handled as the brightness of an object to be photographed, but such photometering output is varied by the ambient temperature even for the same brightness. So, heretofore, the analog output of the photometering circuit has been converted into a digital value, whereafter it has been temperature-compensated by a temperature compensating circuit for compensating for an input signal in accordance with the ambient temperature. Also, in an exposure control circuit designed such that the film speed input as digital information is converted into an analog amount and used for an exposure control operation, it is necessary to effect temperature compensation for the data indicative of the film speed, and a similar temperature compensating circuit is used. In such conventional temperature compensation, however, a temperature compensating circuit for exclusive use becomes necessary, and this leads not only to an increased number of elements but also to complication of the circuit.

SUMMARY OF THE INVENTION

It is an object of the present invention to solve the above-noted problems peculiar to the prior art and to provide an exposure control circuit in a camera which is not provided with a temperature compensating circuit but is designed such that temperature compensation of the same level is effected for an AD-converted digital signal and a DA-converted analog signal.

The present invention has an analog-digital converter and a digital-analog converter using as their respective reference signals a common temperature signal proportional to the absolute temperature, the digital-analog converter converts the film speed information input as a digital value into an analog value on the basis of the temperature signal, and an analog photometering output to which the analog value is added is obtained from a photometering circuit. The analog-digital converter converts the photometering output into a digital value on the basis of the temperature signal. Proper exposure is determined in accordance with the digital value.

In an embodiment of the present invention, an initial control circuit is provided to improve the transient responsiveness during the actuation of the DA converter. When a main switch is closed, an initial signal for shortening the capacitor charging time of filter means provided in the DA converting means is supplied to the DA converting means, instead of a pulse train. Said initial control circuit supplies the DA converting means with a pulse train from pulse train producing means corresponding to the exposure information, instead of the initial signal, when the DA conversion output has become equal to a predetermined analog amount predetermined in conformity with the set exposure information, for example, the film speed information.

Assuming that the capacitor is charged on the low logic side of the pulse train, that the period of the pulse of a duty ratio corresponding to the exposure information is T and that the time of low logic is t0, and if the initial signal is a pulse train having a low logic time of t1>t0, the charging time of the capacitor can be shortened. Preferably, the initial signal may be a low logic signal and in this case, the charging time becomes shortest.

BRIEF DESCRIPTION OF THE DRAWINGS

FIG. 5 is a flow chart showing an example of the main routine of an exposure controlling program.

FIG. 6 is a flow chart showing an example of a pulse train production routine.

FIG. 7 is a flow chart showing an example of an initial control routine.

FIG. 9 is a flow chart showing another example of the initial control routine.

DESCRIPTION OF THE PREFERRED EMBODIMENTS

Figure 1:
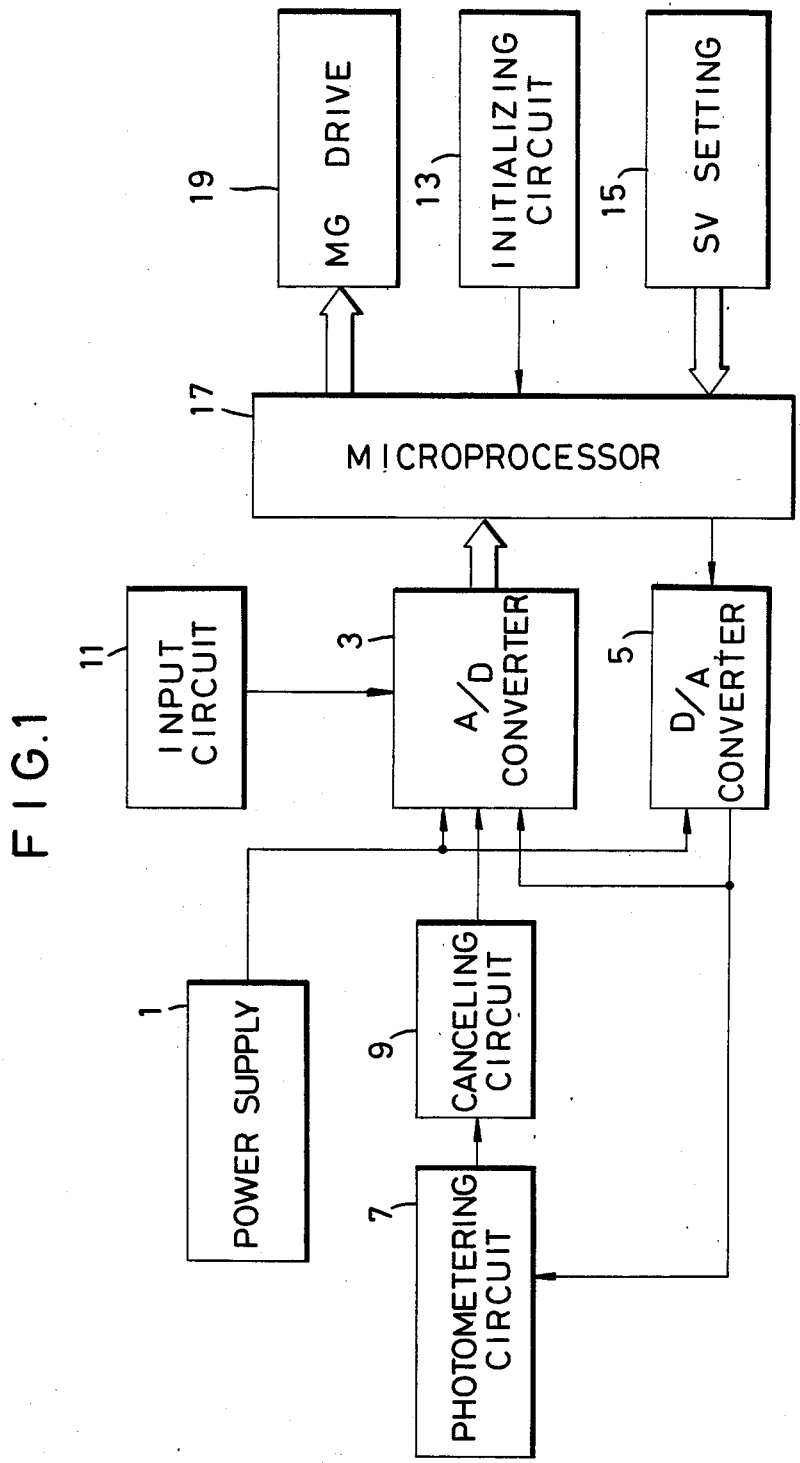
FIG. 1 is a block diagram of an exposure control device according to an embodiment of the present invention.

Referring to FIG. 1 which shows an embodiment of the present invention, the output voltage of a power supply circuit 1 proportional to the absolute temperature is input to the reference signal input terminals of an analog-digital converter (hereinafter referred to as the AD converter) 3 and a digital-analog converter (hereinafter referred to as the DA converter) 5. The output of a photometering circuit 7 is input to the AD converter 3 through a canceling circuit 9. The output of a circuit 11 for inputting aperture information is also input to the AD converter 3. The output of the AD converter 3, the output of an initializing circuit 13 and the output of a film speed setting circuit 15 are input to a microprocessor 17. Also, control signals corresponding to an aperture value and an exposure time which have been determined by the microprocessor are input to a magnet driving circuit 19. The input signal from the film speed setting circuit 15 is converted into a binary number by the microprocessor 17 and a pulse train corresponding thereto is put out to the DA converter 5. The output of the DA converter 5 is input to the photometering circuit 7 as well as to the AD converter 3.

These elements will hereinafter be described in greater detail with reference to FIG. 2.

The reference voltage generating circuit 1 has an operational amplifier A1, voltage dividing resistors R1–R4 and diodes D1, D2, and they are connected together so as to put out a voltage signal proportional to the absolute temperature T. That is, the output voltage V of the operational amplifier A1 can be expressed as $$VA1 = \left(1 + \frac{R3}{R4}\right) \cdot \frac{KT}{q} \ln \frac{R2}{R1}, \quad (1)$$

where
K: Boltzmann constant
q: electron charge
T: absolute temperature.

The electrical characteristics of the diodes D1 and D2 are identical to each other.

An information input circuit 11 is comprised of two variable resistors VR1 and VR2. The variable resistor VR1 is operatively associated with the presetting operation of the aperture of a photo-taking lens, not shown, and accordingly, a voltage signal corresponding to the amount of variation in the aperture can be taken out therefrom. Also, a voltage signal corresponding to the open F value of the photo-taking lens is taken out from the variable resistor VR2.

The initializing circuit 13 comprises a resistor R10 and a capacitor C2, and sets the microprocessor 17 to its initial state when the main switch is closed.

In the present embodiment, the film speed setting circuit 15 comprises three switches SW1-SW3, and can set eight kinds of film speeds in conformity with the ON-OFF states of the switches SW1-SW3.

The microprocessor 17 is a well-known one which has a read only memory ROM, a random access memory RAM and a central processing unit CPU.

The magnet driving circuit 19 has resistors R8, R9, transistors Q2, Q3 and magnets MG1, MG2. The base of the transistor Q2 is connected to the output terminal 01 of the microprocessor 17 through the resistor R8, and the base of the transistor Q3 is connected to the output terminal 02 of the microprocessor 17 through the resistor R9. The magnet MG1 is a stop controlling magnet, and by exciting this magnet MG1, the stop can be stopped at any position. The magnet MG2 is a magnet for controlling the closing blades of a shutter, and by deenergizing this magnet at any point of time after the movement of the opening blades of the shutter, the movement of the closing blades of the shutter can be started.

The DA converter 5 is of the pulse width modulation type (hereinafter referred to as the PWM type). The base of the transistor Q1 of the DA converter 5 is connected to the output terminal 03 of the microprocessor 17 through a resistor R5, the emitter of the transistor Q1 is grounded and the collector of the transistor Q1 is connected to the output terminal of the power supply circuit 1 through a resistor R6. That is, the temperature signal of the power supply circuit 1 is supplied as a reference voltage to the DA converter 5. Also, the collector of the transistor Q1 is connected to one input terminal of an operational amplifier A4 through a filter circuit comprising a resistor R7 and a capacitor C1. Further, the analog output from the operational amplifier A4 is input to the channel CH4 of the AD converter 3.

The photometering circuit 7 is a well-known one which has a photodiode PD interposed between the two input terminals of an operational amplifier A2 and two diodes D3 and D4 disposed in a feedback circuit in a forward direction and which logarithmically converts the photocurrent IL of the photodiode PD and puts out the same. The output voltage VA2 of the operational amplifier A2 can be expressed as $$VA2 = VA4 \frac{2KT}{q} \ln \frac{IL}{IS} \quad (2)$$

where
VA4: output voltage of operational amplifier A4
IS: reverse direction saturation current of diodes D3, D4.

The canceling circuit 9 which cancels the characteristics of the diodes D3 and D4 which depend on temperature has an operational amplifier A3 and two diodes D5 and D6 disposed in the feedback circuit in a reverse direction, and cancels the amount of influence of the temperature characteristic of the diodes D3 and D4, out of the output from the photometering circuit 7. The output voltage VA3 of the canceling circuit 9 can be expressed as:

$$VA3 = VA2 - \frac{2KT}{q} \ln \frac{I2}{IS} = VA4 + \frac{2KT}{q} \ln \frac{IL}{I2} \quad (3)$$

where I2: current flowing into the canceling circuit.

The AD converting circuit 3 is of the successive comparison type which has four input terminals CH1-CH4, and the temperature signal from the power supply circuit 1 is input to the reference voltage input terminal VREF thereof. The temperature signal, as described above, is used in common with the reference voltage of the DA converter 5. The variable resistor VR1 is connected to the channel CH1, the variable resistor VR2 is connected to the channel CH2, the output terminal of the cancelling circuit 9 is connected to the channel CH3, and the output terminal of the operational amplifier A4 is connected to the channel CH4.

In FIG. 1, a switch S100 is a main switch, and letter E designates a battery.

Description will now be made in detail of the film speed SV necessary for the exposure factor control, the photometered value BV, the apex value AV of the aperture value and the apex value AV0 of the open F value while the operations of the various elements of FIG. 1 are described.

(1) Film Speed SV

Film speed information can be input from the film speed setting circuit 15 having three switches SW1-SW3 to the microprocessor 17. When a desired film sensitivity is set in accordance with the ON-OFF state of each switch as shown in Table 1, the microprocessor 17 converts the input data into an 8-bit data as shown in Table 2. The data is represented by "0" when each switch is in its ON position, and is represented by "1" when each switch is in its OFF position. This digital data of the film speed is converted into an analog data in the following manner by the microprocessor 17 and DA converter 5. In the present embodiment, the digital-analog convertion is effected by the PWM system.

TABLE 1

| SV | SW1 | SW2 | SW3 |
|---|---|---|---|
| 25 | 0 | 0 | 0 |
| 50 | 0 | 0 | 1 |
| 100 | 0 | 1 | 0 |
| 200 | 0 | 1 | 0 |
| 400 | 1 | 0 | 0 |
| 800 | 1 | 0 | 1 |
| 1600 | 1 | 1 | 0 |

TABLE 1-continued

| SV | SW1 | SW2 | SW3 |
|---|---|---|---|
| 3200 | 1 | 1 | 1 |

TABLE 2

| SV | 8 BITS DATA | | | | | | | |
|---|---|---|---|---|---|---|---|---|
| 25   | 1 | 1 | 0 | 1 | 0 | 1 | 0 | 1 |
| 50   | 1 | 1 | 0 | 1 | 1 | 0 | 1 | 1 |
| 100  | 1 | 1 | 1 | 0 | 0 | 0 | 0 | 1 |
| 200  | 1 | 1 | 1 | 0 | 0 | 1 | 1 | 1 |
| 400  | 1 | 1 | 1 | 0 | 1 | 1 | 0 | 1 |
| 800  | 1 | 1 | 1 | 1 | 0 | 0 | 1 | 1 |
| 1600 | 1 | 1 | 1 | 1 | 1 | 0 | 0 | 1 |
| 3200 | 1 | 1 | 1 | 1 | 1 | 1 | 1 | 1 |

Figure 3:
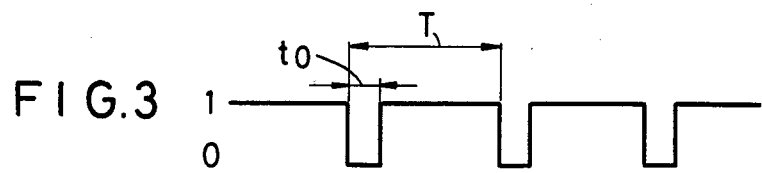
FIG. 3 is a wave form graph for illustrating the operation of a PWM type DA converter.

In the PWM system, a predetermined pulse output wave form is repeatedly generated at a period T as shown in FIG. 3. If the time of the smallest unit during which the pulse wave form is "0" is t0, the relation that $t0 \times 2^8 = 256 \cdot t0 = T$ is established in an 8-bit DA converter. Also, if the digital data shown in Table 2 is expressed as "D", the relation that $$D + \overline{D} = 256$$

is established between "D" and its complementary number "$\overline{D}$". So, by the use of a timer in the microprocessor 17, an output port 03 is first switched on and the value "D" is loaded into the timer, and interruption is applied in the "D"th cycle of the counter and, when the interruption has been applied, the output port 03 is switched off, whereafter the value "$\overline{D}$38 is loaded into the timer and interruption is likewise applied in the "$\overline{D}$"th cycle. If this operation is repeatedly effected thereafter, a periodical pulse train of "D" cycle ON and "$\overline{D}$38 cycle OFF will be obtained.

Figure 4:
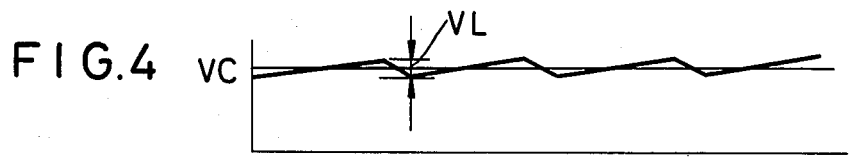
FIG. 4 is a wave form graph showing an example of a DA conversion output.

When the pulse train thus obtained is supplied to the DA converter 5, the analog signal obtained from the DA converter 5, i.e., the input voltage wave form of the operational amplifier A4, becomes such as shown in FIG. 4. In FIG. 4, VC designates an average voltage and VL denotes a ripple voltage. If the time constant of the filter circuit R7, C1 of the DA converter 5 is sufficiently great, the ripple voltage VL can be neglected. The average voltage VC can be expressed as $$VC = VA4 = \frac{t0}{T} \times D \times VA1. \tag{4}$$

The 8-bit data "D", as shown in Table 2, is set such that the data value increases or decreases by 6 each if the film speed varies by an amount corresponding to 1 EV and therefore, as is apparent from equation (4), the LSB of the DA converting circuit assumes a voltage corresponding to 1/6 EV. Input voltages VC corresponding to the respective film speeds at the ambient temperature 25° C. are shown in Table 3 below.

TABLE 3

| SV | D | A4 input voltage (V) |
|---|---|---|
| 25   | 214 | 1.270 |
| 50   | 220 | 1.306 |
| 100  | 226 | 1.342 |
| 200  | 232 | 1.377 |
| 400  | 238 | 1.413 |
| 800  | 244 | 1.448 |
| 1600 | 250 | 1.484 |
| 3200 | 256 | 1.520 |

(2) Apex value AV of Aperture value and Apex value AV0 of Open F-value

The voltage VCH1 input to the input channel CH1 of the AD converter 3 by the use of the apex value AV of the aperture value of the photo-taking lens during photography and the apex value AV0 of the open F-value and set by the variable resistor VR1 is expressed as $$VCH1 = \frac{2KT}{q} \ln 2 \cdot (AV - AV0). \tag{5}$$

This equation shows at how many steps from the open aperture of the photo-taking lens photography is effected. Also, the voltage VCH2 representative of the open F-value of the photo-taking lens set by the variable resistor VR2 can be expressed as $$VCH2 = \frac{2KT}{q} \ln 2 \cdot AV0. \tag{6}$$

This voltage VCH2 is input to the input CH2 of the AD converter 3.

(3) Photometered Value (BV)

Assuming that the photocurrent corresponding to a certain quantity of incident light of the photodiode PD is IL1, that photocurrent becomes 2IL1 if the quantity of incident light becomes twice. Accordingly, the output voltages VA2 and VA2' of the operational amplifier A2 which correspond to the respective quantities of light are:

$$VA2 = VA4 + \frac{2KT}{q} \ln \frac{IL1}{IS} \tag{7}$$

$$VA2' = VA4 + \frac{2KT}{q} \ln \frac{2IL1}{IS}. \tag{8}$$

Accordingly, assuming that the variation in the output voltage of the operational amplifier A2 by the variation in quantity of light is $\Delta VA2$, $\Delta VA2$ can be expressed as:

$$\Delta VA2 = VA2' - VA2 = \frac{2KT}{q} \ln \frac{2IL1}{IS} - \frac{2KT}{q} \ln \frac{IL1}{IS} \tag{9}$$

$$= \frac{2KT}{q} \ln 2$$

That is, if the quantity of light becomes twice, the output voltage of the operational amplifier A2 will increase by $(2KT/q)\ln 2$. The fact that the variation in quantity of light becomes twice is nothing but the fact the quantity of light has increased by an amount corresponding to 1 EV and therefore, in the present embodiment, at the ambient temperature of 25° C., the fluctuation of the factor related to the exposure corresponding to 1 EV varies at a rate of $$\frac{2KT}{q} \ln 2 \approx 36 [\text{mV}]/EV.$$

If there is a resolving power of 1/6 of 1 EV, it is sufficient for the exposure control or the like of a camera and therefore, the voltage corresponding to the LSB of the AD converter may be selected to $$\frac{KT}{3q} \ln 2 \approx 6 (\text{mV}).$$

Assuming that the resolving power of the AD converter is of 8 bits, if the reference input voltage VA1 of the AD converter is $$VA1 = \frac{KT}{3q} \ln 2 \times 2^8 \approx 1.52 \text{ V}, \tag{10}$$

there can be obtained a resolving power of 1/6 EV. This value is obtained by selecting the values of the voltage dividing resistors R1–R4 in the aforementioned equation (1).

Here, by the use of the apex value BV of the object brightness and the apex value AV0 of the open aperture value of the photo-taking lens, the photocurrent IL of the photodiode PD can be expressed as $$IL = \alpha \cdot 2^{(BV-AV0)} \tag{11},$$

where $\alpha$ is a constant, and if equation (11) is substituted into equation (3), the output of the photometering circuit 7 passed through the canceling circuit 9, i.e., the output voltage VA3 of the operational amplifier A3, can be expressed as:

$$VA3 = VA4 + \frac{2KT}{q} \cdot \ln \frac{\alpha \cdot 2^{(BV-AV0)}}{I2} \tag{12}$$

$$= VA4 + \frac{2KT}{q} \left\{ \ln \frac{\alpha}{I2} + (BV - AV0) \ln 2 \right\}.$$

Accordingly, equation (12) may be rewritten as follows by the use of equations (1) and (4):

$$VA3 = \frac{i0 \cdot D}{T} \cdot \frac{R3}{R4} \cdot \frac{KT}{q} \ln \frac{R2}{R1} + \tag{13}$$

$$\frac{2KT}{q} \left\{ \ln \frac{\alpha}{I2} + (BV - AV0) \ln 2 \right\}.$$

Consideration will now be made of what data will be obtained if the output voltage VA3 expressed as equation (13) is AD-converted by the use of a reference input voltage VREF proportional to temperature.

If equation (13) is divided by equation (10), the following will be obtained:

$$\frac{VA3}{VA1} = D + \frac{6 \cdot \frac{\ln \frac{\alpha}{I2}}{\ln 2} + 6(BV - AV0)}{256}. \tag{14}$$

Here, D of the first term indicates the data of the film speed. Also, the second term can be made into an integer with the unit of 1/6 of (BV−AV0) as the smallest unit by appropriately determining the constant $\alpha$, and since the denominator 256 represents the length of the 8-bit data, the value itself of the numerator can be regarded as AD-converted data.

If, in a similar manner, equation (5) regarding the apex value of the aperture value during photography and equation (6) regarding the apex value of the open F-value are divided by equation (10), there can be obtained the digital values of (AV−AV0) and AV0.

An example of the procedure of camera exposure control will now be described with reference to the flow charts of FIGS. 5 to 7.

Main Routine:

At step S1, the microprocessor 17 is initialized by the initializing circuit 13 shown in FIG. 1 to start the operation thereof. Then at step S2, the film speed information is read from the ON-OFF state of the switches SW1–SW3. At step S3, the read film speed information is converted into binary data and stored in a memory.

At step S4, the program jumps to the subroutine and initial control processing is effected when the main switch is closed. The subroutine will be described later. At step S5, three types of information, i.e., the information AV−AV0 of the level difference from the open F-value of the photo-taking lens AD-converted by the AD converter 3 to the current stopped-down value, the information representative of the open F-value and the information BV−AV0+SV to which the photometered value and the film speed have been added are introduced into the microprocessor 17. At step S6, whether the camera has been released is judged and if the judgement is negative, the program returns to step S2, whereat the above-described operations are repeated for standby.

If the judgment at step S6 is affirmative, the program proceeds to step S7, and in order to find the EV value immediately after the camera has been released, the operation of $$EV = BV - AV0 + SV + AV0 = BV + SV \tag{15}$$

is effected. That is, the information obtained from the channels CH1 and CH3 of the AD converter 3 is added. In a camera of the program control type, the combination of the aperture AV* and the shutter speed TV* for a predetermined EV value is predetermined.

Accordingly, at step S8, the predetermined aperture value AV* is found as $$AV^* = \tfrac{1}{2}EV + 1 \tag{16}$$

Then at step S9, $$TV^* = EV - AV^* = \tfrac{1}{2}EV - 1 \tag{17}$$

is operated and the predetermined shutter speed TV* is found.

At step S10, the output VA3 of the operational amplifier A3 is continuously AD-converted by the use of the AD converter 3. The aperture of the phototaking lens is open immediately after the camera has been released and therefore, the AD-converted output of the analog data VA3 is $$BV - AV0 + SV.$$

Here, if the aperture when the photo-taking lens is being stopped down is represented by AV, the AD-converted output at any point of time can be expressed as $$BV - AV + SV.$$

Since BV and SV are constant even immediately after the release, the number of stop-down steps (AV−AV0) from the open aperture can be expressed as:

$$AV - AV0 = (BV - AV0 + SV) - (BV - AV + SV) \qquad (18)$$

The value of AV0 is input from the channel CH2 of the AD converter 3 to the microprocessor 17 and therefore, from the operation of $$(AV - AV0) + AV0,$$

the aperture value AV when the photo-taking lens is being stopped down can be found. Then, at step S11, whether the thus operated aperture value AV has coincided with the predetermined aperture value AV* is judged and, if the judgment is negative, the program returns to step S10, and again the output of the operational amplifier A3 is continuously AD-converted. If the judgment is affirmative, the program proceeds to step S12, and in order to excite the stop controlling magnet MG1, the port 01 is rendered into a high level, whereby the transistor Q2 is turned on. As a result, the stop controlling magnet MG1 is excited and the stop is restrained and controlled to the predetermined aperture value AV*. Then at step S13, the shutter speed TV* is loaded into the counter of the microprocessor 17 in response to the start of the movement of the opening blades of the shutter. At step S14, whether the count value of the counter has reached the predetermined value TV* is judged. If the judgment is negative, the program waits until the count value of the counter reaches TV*, and if the judgment is affirmative, the port 02 is rendered into a low level to deenergize the shutter magnet MG2 to permit the movement of the closing blades of the shutter. As a result, the transistor Q3 is turned off and the magnet MG2 is deenergized, whereby the closing blades of the shutter starts to move.

Pulse Train Production Routine:

The pulse train production routine for producing a pulse train of a duty ratio corresponding to the film speed will now be described with reference to FIG. 6.

When this program is started at a predetermined timing, the flag 1 of the internal timer is turned on at step S31 and the program proceeds to step S32. At step S32, the port 03 is rendered into high logic, and at step S33, the film speed data M(D) stored in the memory is set in the timer. When the timer counts the data M(D), or in other words, when timer interruption is applied, the flag 1 is reset at step S34 and the program proceeds to step S35. At step S35, the port 03 is rendered into low logic, and at step S36, the value M($\overline{D}$) which indicates the complementay number $\overline{D}$ of D is set in the timer. When timer interruption is then applied, the program returns to step S31. Thereafter, these steps are repeatedly executed, whereby there is obtained a pulse train of a duty ratio corresponding to the film speed data.

Subroutine:

The subroutine of the initial control processing will now be described with reference to FIG. 7.

When the program jumps from the step S4 of the main routine to this subroutine, a first pass flag 2 (hereinafter referred to as the flag 2) for discriminating whether the pass of this routine is the first pass is set at step S21. At step S22, the state of the flag 2 is detected and, if it is the first pass, the program jumps to step S23, and if it is the second or subsequent pass, the program jumps to step S29. At step S23, the port 03 of the microprocessor 17 is rendered into "0", i.e., a low logic state, and the transistor Q1 of FIG. 2 is turned off. That is, a low level signal as an initial signal is supplied to the DA converter 5. At step S24, the channel CH4 of the AD converter 3 is selected and the charging voltage of the capacitor C1 of FIG. 2 is rendered capable of being monitored through the output of the operational amplifier A4. At step S25, an analog voltage VF preset in conformity with the film speed input from the switches SW1-SW3 is read and stored in a predetermined area. Then, at step S26, AD converting operation is started and reading of the charging voltage of the capacitor C1 is started. At step S27, the analog voltage VF corresponding to the film speed which was read at step S25 is compared with the AD-converted value of the DA conversion output and, if the two coincides with each other, the program proceeds to step S28 and the AD converting operation is stopped. At step S29, flag 2 is turned off and the program returns to the main routine.

The transient response characteristic during the closing of the main switch will now be described with reference to FIG. 8.

Figure 2:
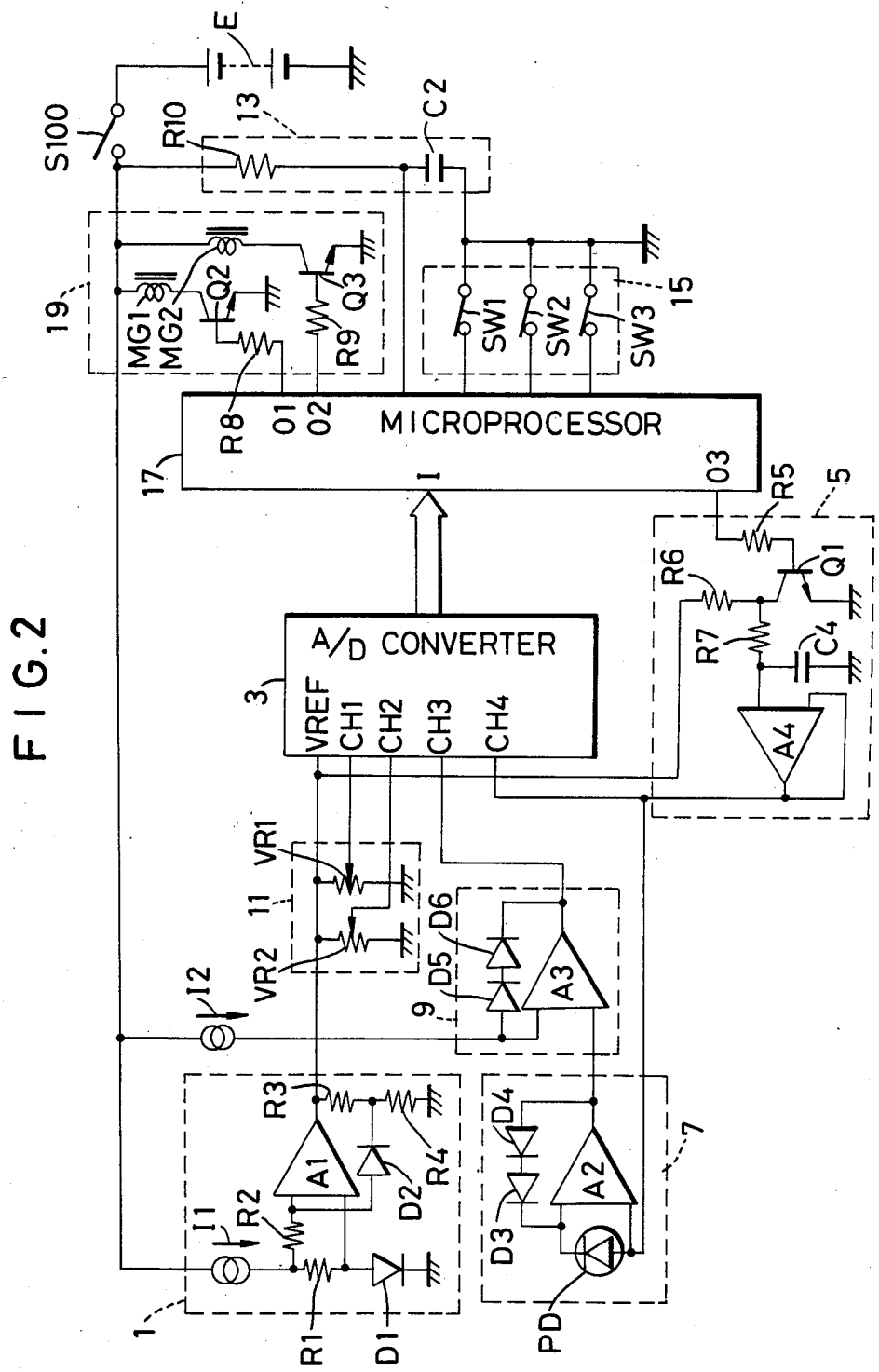
FIG. 2 is a circuit diagram of the device of FIG. 1.
Figure 8:
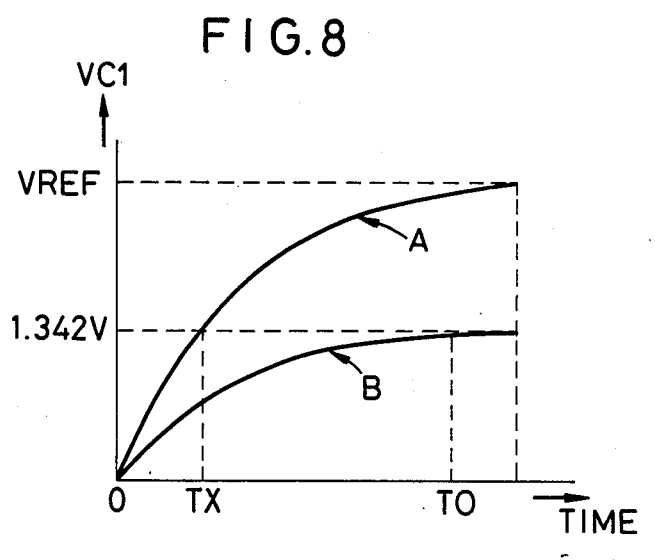
FIG. 8 is a graph showing the charging characteristic of a capacitor C1.

Referring to FIG. 8 which shows the relation between the charging voltage and time of the capacitor C1 in FIG. 2, curve A shows such a charging characteristic that the capacitor C1 is charged to the reference voltage VREF of the DA converter 5 by resistors R6 and R7 when the port 03 of the microprocessor 17 is at "0", that is, in a low logic state (the transistor Q1 is turned off). Curve B shows the charging characteristic of the capacitor C1 when the capacitor C1 is charged by a pulse train of a duty ratio determined by a certain film speed.

In curve B, a time T0 is required before a voltage 1.342 V corresponding, for example, to a film speed ISO 100 is reached. In other words, where a pulse of a duty ratio corresponding to the set film speed ISO 100 is put out from the port 03 when the main switch S100 is closed, the time T0 is required before the charging voltage 1.342 V of the capacitor C1 is reached.

On the other hand, considering curve A, the time required before the charging voltage reaches a voltage corresponding to the same film speed ISO 100 is TX, and TX is in the relation that TX < T0. This is simply because the time TX depends on the charging time constant determined by only the resistance R6+R7 and the capacitor C1, whereas the time T0 is determined by the balance between the charging time constant determined by the resistance R6+R7 and the capacitor C1 and the discharging time constant determined by the resistor R7 and the capacitor C1 when the transistor Q1 is in its ON state.

In the above-described embodiment, design is made such that, the charging current of the capacitor C1 is monitored by the AD converter 3. In contrast, perceiving the fact that the curve A of FIG. 8 is represented by $$VC1 = VREF\left(1 - e^{\frac{-t}{C1(R6+R7)}}\right), \qquad (19)$$

design can be made such that the charging voltage VC1 of the capacitor C1 is indirectly monitored depending on time because the charging voltage of the capacitor C1 depends only on time t if the values of the capacitor C1 and resistors R6 and R7 are constant.

The input voltage of the operational amplifier A4 corresponding to the film speed is determined as shown in Table 3 and therefore, instead of the charging voltage of the capacitor C1 indicated by the curve A of FIG. 8 being monitored by the AD converter, the lapse of time from after the microprocessor 17 has started its operation can be monitored by a timer to thereby indirectly check the charging voltage of the capacitor C1.

Where C1=0.22 μF and R6=4.7 KΩ and R7=75 KΩ, the relation between the film speed and the charging time can be found from equation (19) as shown in Table 4. In Table 4, the theoretical value in the case of the film speed of ISO 3200 is 1.520 V, but in this case, according to equation 19, an infinite time is required in order that the theoretical value may be 1.520 V and therefore, the charging time is found by the use of 1.517 V. That is, 0.003 V (=1.520−1.517) is a voltage corresponding to 1/12EV, for ISO 3200, but in practice, an error of the order of 1/12EV little affects the exposure and can be neglected.

TABLE 4

| SV | A4 input voltage V | Charging time ms |
|---|---|---|
| 25 | 1.270 | 31.6 |
| 50 | 1.306 | 34.4 |
| 100 | 1.342 | 37.6 |
| 200 | 1.377 | 41.4 |
| 400 | 1.413 | 46.5 |
| 800 | 1.448 | 53.5 |
| 1600 | 1.484 | 65.6 |
| 3200 | *1.517 | 109 |

The operation in the case of such a construction follows the subroutine of FIG. 9 instead of the subroutine of FIG. 7. The flow chart of a second embodiment will now be described with reference to FIG. 9. In the other points, the construction of the present embodiment is similar to that of the above-described embodiment with the exception that the input channel CH4 of the microprocessor is not used.

First, at step S41, a first pass flag 2 for discriminating whether this routine is the first one is set. At step S42, the state of the flag 2 is detected and, if it is the first pass, the program proceeds to step S43, and if it is the second or subsequent pass, the program jumps to step S47 and the flag 2 is reset. At step S43, the port 03 of the microprocessor 17 is rendered into "0" and the transistor Q1 of FIG. 2 is turned off. At step S44, time TS corresponding to the set film speed is set in a timer in the microprocessor 17. At step S45, the timer is started, and at step S46, whether the timer time T has become equal to the time TS is judged and, if the judgment is affirmative, the program proceeds to step S47 and the flag 2 is turned off, and then the program returns to the step S5 of the main routine of FIG. 5.

In the second embodiment, the channel CH4 of the microprocessor 17 becomes unnecessary and the connection of the DA converter 5 to its channel CH4 also becomes unnecessary and thus, the circuit is simplified as compared with the first embodiment.

In the foregoing description, an initial signal of low level has been supplied to the base of the transistor Q1 during the closing of the main switch, but alternatively, a pulse train of OFF time t1 longer than the OFF time t0 in the pulse train of a duty ratio corresponding to the set film speed may be supplied as an initial signal to the transistor Q1. The information to be DA-converted is not limited to film speed information, but also includes other exposure information such as open F-value, aperture value and stopped-down value.

I claim:

1. An exposure control device in a camera comprising:
    power supply circuit means for producing a temperature signal representative of an amount proportional to absolute temperature;
    means for producing a first digital data representative of film speed;
    digital-analog converting means for producing a first analog output depending on ambient temperature from said first digital data and said temperature signal;
    photometering means having means for producing a second analog output corresponding to the brightness of an object to be photographed and means for adding said second analog output to said first analog output and preparing a photometering output;
    analog-digital converting means for preparing a second digital data independent of the ambient temperature from said temperature signal and said photometering output; and
    means for determining the exposure in accordance with said second digital data.

2. An exposure control device according to claim 1, wherein said digital-analog converting means includes means for preparing a pulse train having a duty ratio corresponding to said first digital data, and means for converting a reference voltage corresponding to said temperature signal into an analog value in accordance with the duty ratio of said pulse train.

3. An exposure control device according to claim 2, wherein said digital-analog converting means includes a time constant circuit including capacitor means and resistor means and charged by said reference voltage, and switching means for controlling the charging of said time constant circuit in response to said pulse train.

4. An exposure control device according to claim 3, further comprising means for preparing an initial signal having an output of a sufficient magnitude to expedite the charging of said capacitor means relative to the duty ratio corresponding to said first digital data, and initial control means for supplying said initial signal instead of said first digital data to said digital-analog converting means until said first analog output reaches a predetermined level.

5. An exposure control device according to claim 1, wherein said photometering means includes a photometering circuit including photoelectric converting means and means for logarithmically converting a current flowing to said photoelectric converting means, and a canceling circuit connected to said photometering circuit for canceling the characteristic of said photometering circuit which depends on temperature.

6. An exposure control device according to claim 1, wherein said analog-digital converting means successively compares said photometering output with the reference voltage corresponding to said temperature signal and prepares said second digital data.

7. An exposure control device in a camera comprising:
    means for preparing a digital data regarding a factor determining exposure;
    means for preparing a pulse train having a duty ratio corresponding to said digital data;
    digital-analog converting means including filter means having capacitor means and resistor means and means for supplying a reference voltage to said filter means, said digital-analog converting means converting said reference voltage into an analog output in accordance with the duty ratio of said pulse train;

means for preparing an initial signal having an output of a sufficient magnitude to expedite supply of said reference voltage to said filter means, relative to the duty ratio corresponding to said digital data; and initial control means for supplying said initial signal instead of said pulse train to said digital-analog converting means until said analog output reaches a predetermined value.

8. An exposure control device according to claim 7, wherein said digital-analog converting means includes a circuit for charging said capacitor means of said filter means by said reference voltage, and switching means for controlling said charging circuit by said pulse train, and said initial signal, as compared with said pulse train, controls said switching means so that the charging of said capacitor means is expedited.

9. An exposure control device according to claim 8, wherein said initial signal is a pulse train signal having a duty ratio different from that of said pulse train.

* * * * *